United States Patent
Rupp

(10) Patent No.: US 6,916,504 B2
(45) Date of Patent: Jul. 12, 2005

(54) METHOD FOR PRODUCING A COMPOSITE

(75) Inventor: Roman Rupp, Hilpolstein (DE)

(73) Assignee: Pfleiderer Daemmstofftechnik GmbH & Co. KG, Neumarkt (DE)

( * ) Notice: Subject to any disclaimer, the term of this patent is extended or adjusted under 35 U.S.C. 154(b) by 0 days.

(21) Appl. No.: 10/332,004

(22) PCT Filed: Aug. 2, 2001

(86) PCT No.: PCT/EP01/08968

§ 371 (c)(1),
(2), (4) Date: Jul. 1, 2003

(87) PCT Pub. No.: WO02/10082

PCT Pub. Date: Feb. 7, 2002

(65) Prior Publication Data

US 2004/0092189 A1 May 13, 2004

(30) Foreign Application Priority Data

Aug. 2, 2000 (DE) .......................................... 100 37 723

(51) Int. Cl.$^7$ ................................................ B05D 3/02
(52) U.S. Cl. ...................... 427/387; 428/447; 428/429; 156/329
(58) Field of Search .......................... 427/387; 428/447, 428/429; 156/329

(56) References Cited

U.S. PATENT DOCUMENTS 3,654,058 A    4/1972   Jasinski et al.
5,591,818 A  * 1/1997  Standke et al. ............... 528/38

FOREIGN PATENT DOCUMENTS

| EP | 837 090 | * | 4/1998 |
| WO | WO 98 21266 | | 5/1998 |

\* cited by examiner

Primary Examiner—Margaret G. Moore
(74) Attorney, Agent, or Firm—Jordan and Hamburg LLP

(57) ABSTRACT

The invention relates to a method for producing a composite from inorganic substances and binders on the basis of silane. The inventive method is characterized by the use of one or more silicon compounds of the general formula (1) as the binder, wherein R represents groups that are the same or different and that cannot be hydrolytically cleaved, and wherein X represents one or more hydroxyl groups or one or more hydrolytically cleavable groups that are the same or different, and n is a number between 0 and 3, preferably between 1 and 2. Said silicon compounds have been previously condensed with understoichiometric amounts of water per mole silicon compound in the presence of alkaline or acidic catalysts. The inorganic substances used are bundles or strands of glass and/or mineral fibers onto which the precondensed silicon compounds have been sprayed in amounts of from 1 to 20% by weight, preferably together with overstoichiometric amounts of water. The strands or bundles so treated are then brought into their final shape and are deformed or compressed to give shaped bodies.

14 Claims, No Drawings

METHOD FOR PRODUCING A COMPOSITE

The present invention relates to a method for producing a composite of the introductory portion of the main claim, as well as to a composite of inorganic materials and binders based on silane, which are produced according to the method.

Silicon compounds are used in the form of esters of silicic acid, for example, as binders for ceramic mold materials for precision or accurate castings. In this connection, it is necessary to use larger amounts of silicon compounds, in order to achieve complete binding of the molding used, so that accurately reproducible casting molds are obtained.

Silanes, such as methyltriethoxysilane (MTEOS) or tetraethoxysilane (TEOS), in conjunction with colloidal organic particles (DE-196 47 369 A1) are also already known in the form of a nano composites for binding composite based on glass fibers, mineral fibers or wood materials. However, since thin silane coatings tend to form cracks, it has, until now, been necessary to add colloidal inorganic particles.

It is an object of the present invention to provide a method for the preparation of a composite of inorganic materials and binders based on silanes, with which composites for the building industry as well as high-strength materials, for example, for the automobile industry and especially for interior lining for automobiles, can be produced. As binders for the composites, produced pursuant to the invention, silanes of the general formula $R_n\text{—}Si\text{—}X_{4-n}$, in which R represents identical or different groups, which cannot be split off hydrolytically, and X represents one or more hydroxyl groups or one or more groups, which can be split off hydrolytically and may be the same or different, and n represents a number between 0 and 3.

As R groups, which cannot be split off hydrolytically, preferably alkyl groups with one to four carbon atoms, preferably methyl, ethyl, propyl, i-propyl, butyl and i-butyl groups, alkenyl groups, preferably those with two to four carbon atoms, such as vinyl groups, 1-propenyl groups, 2-propenyl groups or butenyl groups, alkinyl groups, preferably alkinyl groups with two to four carbon atoms, such as acetylenyl or propargyl groups, aryl groups, preferably with 6 to 10 carbon atoms, such as phenyl groups or naphthyl groups or mixed groups from the aforementioned alkyl and aryl groups are used. Cyclic groups, such as cyclopropyl groups, cyclopentyl or cyclohexyl groups can also be used. All of these groups named may also contain halogen, hydroxy, alkoxy, amino or epoxide groups as additional substituents.

Especially preferred is the use of silanes, which may contain low molecular weight alkyl groups with one to four carbon atoms, especially methyl groups or ethyl groups or phenyl groups with six to ten carbon atoms, which optionally may also be substituted. In the silicon compounds of the general formula, the value of n preferably is 0, 1 or 2, 0 or 1 being particularly preferred. Exceptionally good results are obtained if at least 60% and especially at least 70% by weight of the silicon compounds of the formula have a value of 1 for n and especially if more than 80% and particularly more than 90% by weight have a value of 1 for n, the use of 100% of such silanes has also been possible.

Methods, in which the silanes used either are methyltriethoxysilane (MTEOS) or tetraethoxysilane (TEOS) are particularly preferred.

As X groups, especially hydroxyl groups or groups which can be split off hydrolytically, such as hydrogen, alkoxy groups, preferably alkoxy groups with two to four carbon atoms, such as the ethoxy groups, n-propoxy groups, i-propoxy groups or butoxy groups, aryloxy groups, particularly those with six to ten carbon atoms, such as phenoxy groups, alkaryloxy groups, such as benzyloxy groups, azyloxy groups, preferably those with one to four carbon atoms, such as acetoxy groups or propionyl groups, alkylcarbonyl groups, such as acetyl or halogen groups, such as fluoro groups, chloro groups, bromo groups or iodo groups, particularly chloro groups or bromo groups, come into consideration. Further X groups are anino groups, which may be unsubstituted or substituted, for example, by mono- or dialkyl groups, aryl groups or aralkyl groups, amido groups, such as the benzamido group and aldoxime or ketoxime groups. The X groups may also be linked to one another by bridging atoms, as may be the case, for example, with silicon-polyol complexes, which are derived from glycol, glycerin or catechol.

Particularly preferred as X groups are alkoxy groups with two to four carbon atoms, especially ethoxy groups. Methoxy groups can also be used. However, they have a high reactivity, so that, during the synthesis of the binder, it is necessary to cool strongly, in order to control the exothermic reaction. Moreover, such binder systems have a shorter shelf life and a short processing time. During the processing, it is necessary to keep the methanol within strict limiting values.

Special examples of silicon compounds of the general formula are the following:

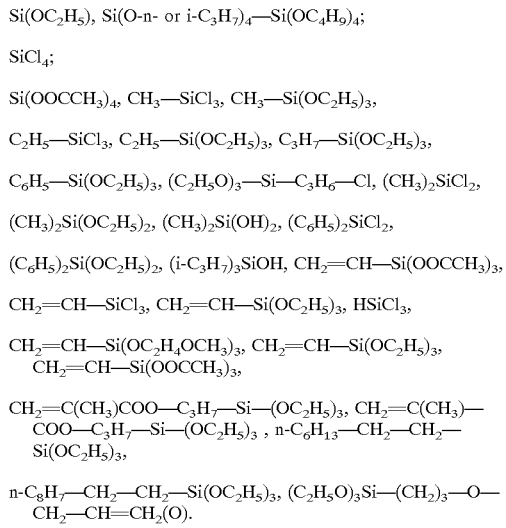

The binders, which are based on silanes and used in the inventive method, are used, in general, in the form of precondensates, which can be obtained by reacting the silanes with substoichiometric amounts of water, especially with less than 3 moles, preferably with 1 to 2 moles of water per mole of silicon compound, in the presence of basic or acidic catalysts. At the same time, generally soluble oligomers are formed by the partial high doses of the silanes in the reaction medium. These oligomers may have a degree of condensation of, for example, about 2 to 100 and preferably of about 2 to 6. The amount of water, used for the precondensation of the silanes, preferably ranges from 0.1 to 0.9, especially from 0.2 to 0.8 and particularly from 0.35 to 0.45 moles of water per mole of the X group, which can be split off hydrolytically.

The silicon compounds, used in the inventive method, can be applied on glass fibers or mineral fibers by the following methods: spraying, flooding, immersing, casting.

In particular, the silicon compounds are applied on the fibers by spraying methods, which can be carried out as follows.

Immediately after they are produced, the mineral fibers are passed through a spray ring, which contains several spray nozzles. The silicon compounds are transported with the help of pumps to this spray ring and the material is distributed over the fibers through nozzles, so that uniform spraying is achieved.

The precondensation of the silicon compounds is generally carried out at temperatures ranging from 15° to 80° C., preferably at temperatures ranging from 20° to 75° C. and especially at temperatures ranging from 25° to 45° C.

Moreover, the reactive compounds, such as

$Si(OC_2H_5)_4, CH_3-Si(OC_2H_5)_3, C_2H_5-Si(OC_2H_5)_3$ can be reacted at room temperature, while the less reactive compounds, such as

$n-C_6H_{13}-CH_2-CH_2-Si(OCH_2H_5)_3$ or

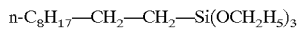

$n-C_8H_{17}-CH_2-CH_2-Si(OCH_2H_5)_3$ can be reacted at elevated temperatures ranging from 35° to 80° C.

The fibers, fiber strands or fiber bundles of glass and/or mineral fibers, treated according to the inventive method, can be brought into the final form in different ways and shaped or pressed into molded objects. This is generally done in the following manner:

The fibers are produced by means of so-called blowing or hissing methods or by combinations of the two methods and, immediately after they are produced, sprayed with the binder. The sprayed fibers are placed on a perforated plate and transferred with the help of the plate into a curing oven. In the curing oven, the web of fibers is compressed to the desired thickness with the help of a perforated upper and lower belt and the binder is cured.

During the production of the composites, which are to be used, for example, in building or insulation technology, the deformation or compression pressures are relatively low. On the other hand, for the production of molded objects, which are to be used, for example, as parts for interior fittings for automobiles or the like, very high compressive pressures up to 30 bar may be used. The invention is described in greater detail in the following by examples.

EXAMPLE 1

MTEOS (1 kg) was added to an Erlenmeyer flask at room temperature and 120 g of water were added. Initially, the mixture is in two phases, the water forming the lower phase, above which there is the alkoxysilane (in this case, MTEOS). However, the hydrolysis and condensation reactions are already commencing at the interface. It is therefore important to add the catalyst, that is, the acid, as quickly as possible. Concentrated sulfuric acid (14 g, 37% by weight) is added all at once and, immediately afterwards or already during the addition, the mixture is stirred as rapidly as possible with a propeller stirrer or a stator-rotor mixer. Stirring is continued for 5 minutes, after which the mixture is filled into a plastic vessel, which can be closed off. The binder is kept for two days at room temperature.

After that, the mixture is activated with 15 g (ROR=0.45) or 30.5 g (ROR=0.5) of water, in that the water is added in small portions with constant stirring. The mixture is stirred intensively for about 10 minutes.

After that, the mixture is ready for processing (tacky) and can be used for gluing the glass wool. For gluing the glass wool, 500 g of the activated mixture is sprayed with a spray gun on 2 kg of glass wool, which are mixed constantly in a mixing drum.

The sprayed glass wool is taken from the drum and compressed between two perforated sheets (30 cm×30 cm, 1 kg load) and dried in a circulating air drying oven at 250° C. for 3 minutes. After 3 minutes, the glued glass wool (bound glass wool) between the perforated sheets can be removed. By these means, a coherent glass wool insulating material is obtained.

EXAMPLE 2

MTEOS (1 kg) is reacted with 182 g of water and 14 g of concentrated sulfuric acid, having a concentration of 37% by weight. The sulfuric acid is added all at once and the mixture is stirred as vigorously as possible directly after or already during the addition. More water is used for this synthesis and smaller amounts or no water is used for the activation. The shelf life of the mixture is shorter. The mixture can be used without activation directly one hour after the synthesis. Glass wool (1 kg) is sprayed once again with 500 g of binder, as in Example 1.

EXAMPLE 3

MTEOS (1 kg) was added to an Erlenmeyer flask at room temperature and 242 g of water were added. Initially, the mixture is in two phases, water forming the lower phase, above which there is the alkoxysilane (in this case, MTEOS). However, the hydrolysis and condensation reactions are already commencing at the interface. Concentrated sulfuric acid (14 g, 37% by weight) is added all at once and the mixture is stirred as rapidly as possible with a propeller stirrer or a stator-rotor mixer already during the addition.

Stirring is continued for about 5 minutes, after which the mixture is allowed to cool to room temperature. The mixture is not activated before the spraying.

Spraying is carried out as in Example 1, 2 kg of glass being sprayed with 500 g of binder.

EXAMPLE 4

MTEOS (1 kg) and 130 g of tetraethoxysilane (TEOS) are added to an Erlenmeyer flask at room temperature and mixed and 130 g of water are added to this mixture all at once. Initially, the mixture is in two phases, water forming the lower phase, above which there is the mixture of alkoxysilanes, in this case, a mixture of MTEOS and TEOS. To this mixture, 16.6 g of sulfuric acid are added all at once. The addition is followed immediately by vigorous stirring for about 5 minutes. The mixture is then filled into a plastic container and kept for two days in order to mature.

After the two days, the mixture is activated with 35 g (ROR=0.5) of water before it is sprayed for gluing the glass wool, in that the water is added in small portions with constant stirring. The mixture is then stirred constantly for about 10 minutes.

Case a):

Subsequently, the mixture is ready for processing and can be filled into a spray gun. Glass fibers (2 kg) are added to a mixing drum and the binder is sprayed into the drum with constant mixing, in order to distribute the binder uniformly on the fibers. After that, the sprayed fibers are placed between two perforated plates, which are placed under load with a weight of 1 kg.

The sprayed glass wool between the perforated sheets is dried for 3 minutes in a circulating air drying oven. By means of this procedure, a coherent glass wool insulating material is obtained, which can be removed from the perforated sheets, which have been pressed together.

Case b):

The activated binder (1 kg) can be activated shortly before spraying with the help of a stator-rotor mixer with 3 kg of water, if the material is sprayed directly afterwards onto the glass wool.

If 800 g of this water-binder mixture are sprayed after the mixing process directly onto 2 kg of glass wool, a coherent glass wool insulating material is obtained after 3 minutes of forced ventilation between the perforated sheets in a circulating air drying oven.

What is claimed is:

1. A method for producing a composite material of inorganic materials and silicon compound-based binders, comprising precondensing with substoichiometric amounts of water per mole of silicon compound in the presence of basic or acidic catalysts, one or more silicon compounds of the general formula $$R_n\text{—Si—}X_{4-n}$$

in which any R's present are identical or different groups which cannot be split off hydrolytically, and X is one or more hydroxyl groups or one or more groups which can be split off hydrolytically and are identical or different, and n is a number between 0 and 3, applying a composition comprising the precondensed silicon compound in amounts of 1 to 30% by weight with a greater than stoichiometric amount of water to inorganic materials comprising bundles or strands of glass fibers and/or mineral fibers, and then molding the resultant binder-carrying inorganic materials into molded objects.

2. The method of claim 1, wherein the bundles or strands of fibers comprise a nonwoven material of random orientation.

3. The method of claim 1 or 2, wherein the inorganic fibers have an average diameter of approximately 4 to 10 mm and an average length ranging from 10 to 1000 mm.

4. The method of claim 1, wherein the molar ratio of water to hydrolyzable groups X ranges from 0.2 to 0.8 for the precondensation.

5. The method of claim 1, wherein the silicon compound is tetraethoxysilane or methyltriethoxysilane.

6. The method of claim 1, wherein n =1 in at least 60% by weight of the silicon compounds in the composition.

7. The method of claim 1, wherein the X group is an alkoxy group with 1 to 4 carbon atoms.

8. The method of claim 1, wherein R is an alkyl group with 1 to 4 carbon atoms, or a phenyl group.

9. The method of claim 1, wherein the amounts of water for the precondensation are 1 to 2 moles of water per mole of silicon compound.

10. The method of claim 1 or 2, wherein the composition to be applied to the inorganic materials comprises, in weight percentages, based on the weight of the fiber/glass:

| silicon compounds | 2 to 40% |
|---|---|
| catalyst | 0.1 to 2% |
| water | 10 to 140% |

11. The method of claim 10, wherein the composition to be applied to the inorganic materials is prepared by mixing the catalyst and the water with said silicon compounds and aging the mixture for a period of 0.1 to 24 hours.

12. A composite produced by the method of any one of claims 1, 2 and 4 to 9.

13. The method according to claim 1, wherein n is 1 to 2.

14. The method according to claim 8, wherein the alkyl group has 1 to 3 carbon atoms.

* * * * *